United States Patent [19]

Griesenbrock

[11] 4,318,450
[45] Mar. 9, 1982

[54] CHASSIS DRIVE ARRANGEMENTS FOR ELECTRICALLY DRIVEN MOBILE WORKING MACHINES

[75] Inventor: Karl-Heinz Griesenbrock, Stuvenborn, Fed. Rep. of Germany

[73] Assignee: Firma Jungheinrich Unternehmensverwaltung KG, Hamburg, Fed. Rep. of Germany

[21] Appl. No.: 87,693

[22] Filed: Oct. 23, 1979

[30] Foreign Application Priority Data

Oct. 28, 1978 [DE] Fed. Rep. of Germany ....... 2847033

[51] Int. Cl.³ .......................... B62D 61/06; B60K 1/00
[52] U.S. Cl. ................................. 180/212; 180/54 C; 180/65 C; 180/252; 180/294; 180/298
[58] Field of Search ..................... 180/55, 65 R, 65 C, 180/65 E, 54 E, 242, 308, 11, 12, 13, 54 C, 211, 212, 216, 294, 298, 247

[56] References Cited

U.S. PATENT DOCUMENTS

| | | | |
|---|---|---|---|
| 2,942,677 | 6/1960 | Gray | 180/212 |
| 3,620,321 | 11/1971 | Thibodeau . | |
| 3,773,132 | 11/1973 | Gawlick | 180/291 |

FOREIGN PATENT DOCUMENTS

| | | |
|---|---|---|
| 1097299 | 1/1961 | Fed. Rep. of Germany . |
| 2225257 | 12/1972 | Fed. Rep. of Germany . |
| 2350038 | 5/1974 | Fed. Rep. of Germany . |
| 2246855 | 3/1977 | Fed. Rep. of Germany . |
| 2511452 | 11/1979 | Fed. Rep. of Germany . |
| 771676 | 4/1957 | United Kingdom . |
| 853045 | 11/1960 | United Kingdom . |
| 1029284 | 5/1966 | United Kingdom . |

OTHER PUBLICATIONS

"Techno-tip", Issue 4, Apr. 1977.
"ZWF", Issue 3, Jan. 1978, Assembly of Prefabricated Machine Parts for Forklifts.

Primary Examiner—Robert R. Song
Attorney, Agent, or Firm—Toren, McGeady & Stanger

[57] ABSTRACT

A drive arrangement in the chassis of an electrically powered mobile machine such as a fork lift or the like having a steerable wheel assembly at one end of the chassis and a non-steerable wheel assembly at the opposite chassis end wherein each wheel includes coupling means for connection to a driving motor and one or more driving motors may be selectively mounted in the chassis to selectively drive one, two, several or all wheels of the vehicle as may be desired.

1 Claim, 4 Drawing Figures

CHASSIS DRIVE ARRANGEMENTS FOR ELECTRICALLY DRIVEN MOBILE WORKING MACHINES

The present invention relates to chassis drive arrangements for electrically driven mobile working machines such as particularly counterbalance type lifters, the drive arrangement including wheel assemblies adjacent two opposite ends of the chassis, the wheel assemblies comprising steered wheels on the one hand and non-steerable wheels on the other hand, and further including a controller for at least one geared driving motor whereby at least one steered wheel is associated with a pivoted bogie.

Heretofore known chassis of the above type have been designed with a single-motor drive at the front axle in combination with a differential (e.g. U.S. Pat. No. 3,773,132) or at the pivoted bogie in the form of a rear-wheel drive (e.g. British Pat. No. 853,045). In vehicles with two front wheels it is also known to provide single-wheel drives at these front wheels by installation of separate geared driving motors at these wheels (e.g. German provisional patent specification DAS No. 1,530,511). In chassis drive arrangements of these types there may only be decided in view of the intended usage whether a front-wheel drive, particularly a front-wheel two-motor drive, would be superior to a rear-wheel drive, particularly a single-wheel rear-wheel drive, or vice versa. When negotiating narrow curves, a rear-wheel drive may operate in a more favorable rotary speed range under energy saving conditions because of the longer effective lever arm provided by the wheel base whereas for traveling uphill and as the case may be with reduced friction of the tire of a wheel on a wet road surface a rear-wheel drive, particularly when driving a steerable rear wheel, is disadvantageous because the tire lateral guiding capacity is reduced and therefore the steering capability is impaired by the applied traction torque. Thereby, simultaneously, the traction capability of the vehicle is reduced. There is a risk that under such conditions a lifter vehicle breaks out from its selected target direction.

Heretofore, chassis drive arrangements of the type indicated above, particularly for lifters, have been manufactured in different designs each of which was adapted to a certain type of usage. This rigid scheme does not permit a modification of the drive arrangement if a later modification should be considered necessary because of different usage conditions, with the result that subsequent modifications were possible only at high costs, provided that conventional chassis were suitable at all for a later change-over.

It is the object of the present invention to improve a chassis drive arrangement of the type as stated in the first paragraph of the present specification in a manner allowing to readily realize, from the start, all conceivable drive arrangements at relatively small costs during the original assembly operation or subsequently in an already fully assembled machine to thereby achieve economically an optimum drive arrangement even in the case of modifications in chassis that are already in use.

This object is achieved, in accordance with the present invention, in that both wheel assemblies are designed each for connection to at least one geared driving motor which is selectively mountable on the chassis as a drive assembly whereby in an arrangement at only one wheel assembly one geared driving motor is designed for the entire vehicle propulsive power, and in an arrangement at two or more wheel assemblies at least two geared driving motors are designed for each delivering a portion of the total vehicle propulsive power and jointly delivering the total vehicle propulsive power. This proposed expedient allows to provide the chassis with a drive arrangement that will be adapted to the actual usage, without necessitating any modifications to the basic design of the chassis.

In cases in which an extremely good maneuvering capability may be dispensed with and a good climbing capacity of the chassis is more important, it will be possible, with this novel arrangement, to provide a drive in the front part of this chassis, i.e. particularly where are disposed the non-steerable wheels. When the conditions of usage change, the restricted maneuvering capability in the described case may be a disadvantage. In this case the chassis drive may be converted readily by installing a geared driving motor at the steered wheel disposed on the pivoted bogie.

In the following, the present invention will be described more in detail with reference to several embodiments shown in the appended drawings wherein FIG. 1 is a schematical lay-out of a chassis drive arrangement in the form of rear-wheel drive in accordance with a first embodiment of the present invention;

Figure 1:
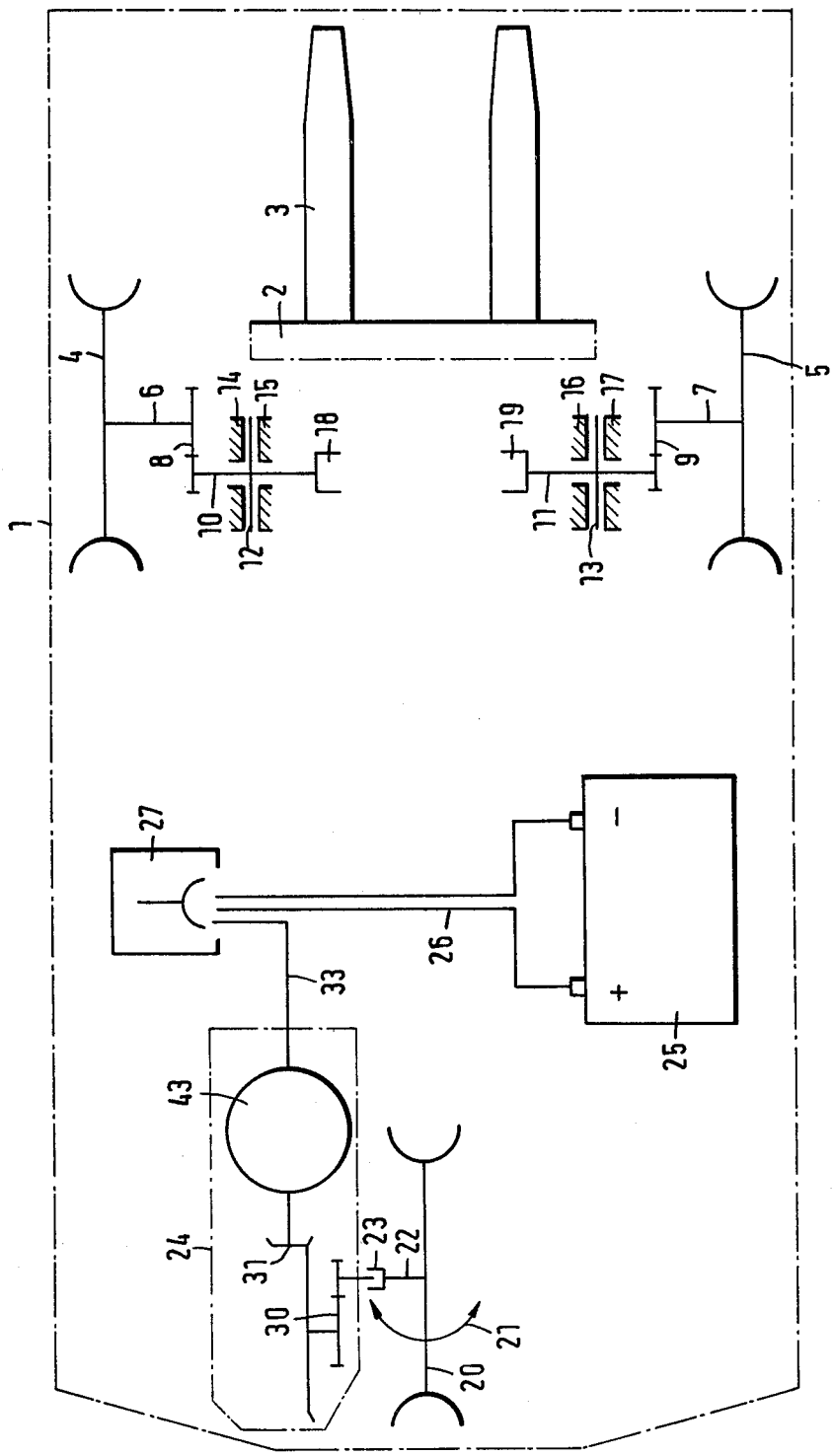

The contours of the chassis of a vehicle are indicated generally by the reference numeral 1. If the vehicle is designed as a lifter, then the chassis will include, as indicated schematically, a lifting structure 2 with an upwardly movable load carrier 3. This lifting device since not being relevant to the present invention will not be described in more detail.

At the front end of the chassis in the vicinity of the lifting structure are arranged two non-steerable front wheels 4, 5 which are mounted on rigid axles 6, 7 respectively. The axles 6, 7 are respectively connected to a brake shaft 10, 11 via an associated gear transmission 8, respectively 9. On the brake shafts 10, 11 are arranged disks 12, 13 respectively of disk brakes the brake shoes 14, 15 and 16, 17 respectively of which may be moved toward each other. The front wheels 4, 5 define together with their associated parts a wheel assembly. The brake shafts 10, 11 are provided at their mutually facing ends with coupling means 18, 19 respectively. The brake shafts may likewise be designed as stub shafts adapted to provide drive connections.

At the rear end of the vehicle is disposed a rear wheel 20. There may likewise be provided twin wheels on a common shaft or with a differential between the twin wheels. Whatever may be the case, the one rear wheel or the optionally two rear wheels will be mounted on a pivoted bogie known per se and adapted to be rotated about a vertical axis in the directions indicated by the double-headed arrow 21 whereby the one wheel or the two wheels are steerable. This rear wheel 20 or respectively the wheel arrangement symbolized thereby defines another wheel assembly. This wheel assembly that is connected to the pivoted bogie includes an outwardly extending axis 22 that is provided with coupling means 23.

In the chassis is also arranged a traction battery 25 connected by lines 26 to a controller 27 for travel drive control.

This embodiment of FIG. 1 as far as described up to the coupling means 18, 19 and 23 allows any desired arrangement as far as the installation of geared driving motors at one axle or at several axles is concerned.

According to FIG. 1 the coupling means 18, 19 at the brake shafts 10, 11 respectively are left free, and there is merely installed a geared driving motor 24 at the rear wheel 20. The geared driving motor 24 is connected to the coupling means 23 and includes a gear transmission 30 as well as a bevel gear step 31. The bevel gear step 31 is connected to the shaft of an electric motor 43. The electric motor 43 is connected to the controller 27 by a line 33. FIG. 1 thus illustrates a vehicle with a rear-wheel drive whereby the electric motor 43 is rated for delivering the entire vehicle propulsive power.

Figure 2:
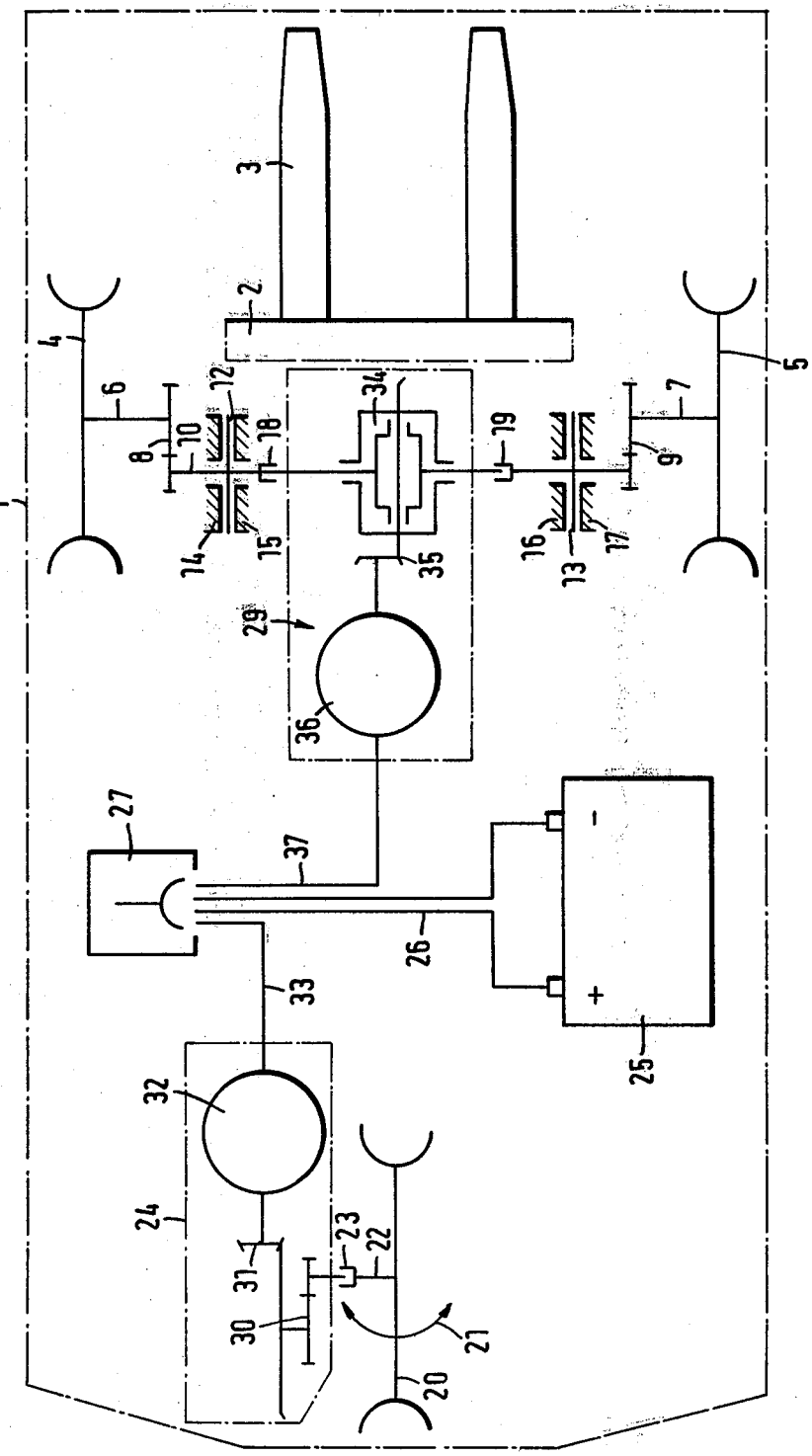
FIG. 2 is a view similar to FIG. 1 but showing a chassis drive arrangement in the form of an all-wheel drive.

In FIG. 2, the same reference numerals are employed for similar parts, and this FIG. illustrates an embodiment with an all-wheel drive by means of two geared driving motors 24 and 29. The geared driving motor 24 corresponds to the one described above with reference to FIG. 1 but for a different rating, particularly of the electric motor 32. The geared driving motor 29 includes a differential 34 intermediate the coupling means 18, 19, and this differential is driven by the electric motor 36 through a bevel gear step 35. The electric motor 36 is connected to the controller 27 by lines 37. Both electric motors 32, 36 are jointly designed for an output corresponding to the overall vehicle propulsive power. In view of certain adaptations the rating of the front driving motor may be different from the rating of the rear driving motor. A vehicle of the type illustrated in FIG. 1 provides an optimum performance with respect to maneuvering capability and climbing capacity.

Figure 3:
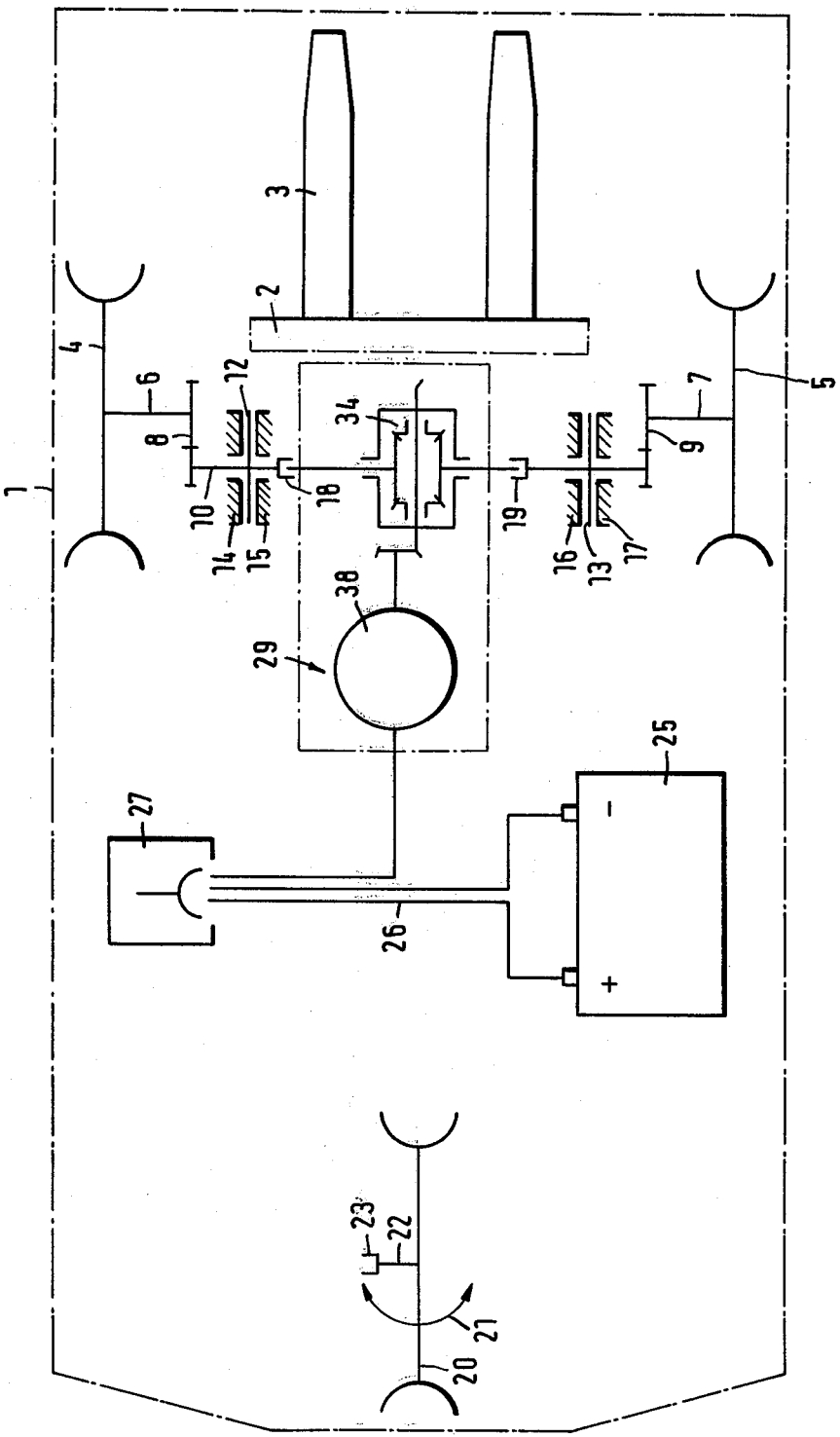
FIG. 3 is a view similar to FIG. 1 of a chassis drive arrangement but illustrating a front-wheel drive.

In FIG. 3 there are again employed the same reference numerals for similar parts. According to FIG. 3 there is merely provided the geared driving motor 29 as described previously wheereas the geared driving motor 24 is omitted. In FIG. 3 is thus illustrated a chassis with front-wheel drive and a differential 34 intermediate the front wheels 4, 5 that are mounted on rigid axles. This arrangement provides the advantages described above. It may be seen that this arrangement may be obtained easily with the basic layout of the chassis. In FIG. 3, the electric motor 38 of the geared driving motor 29 is rated so as to deliver the total propulsive power.

Figure 4:
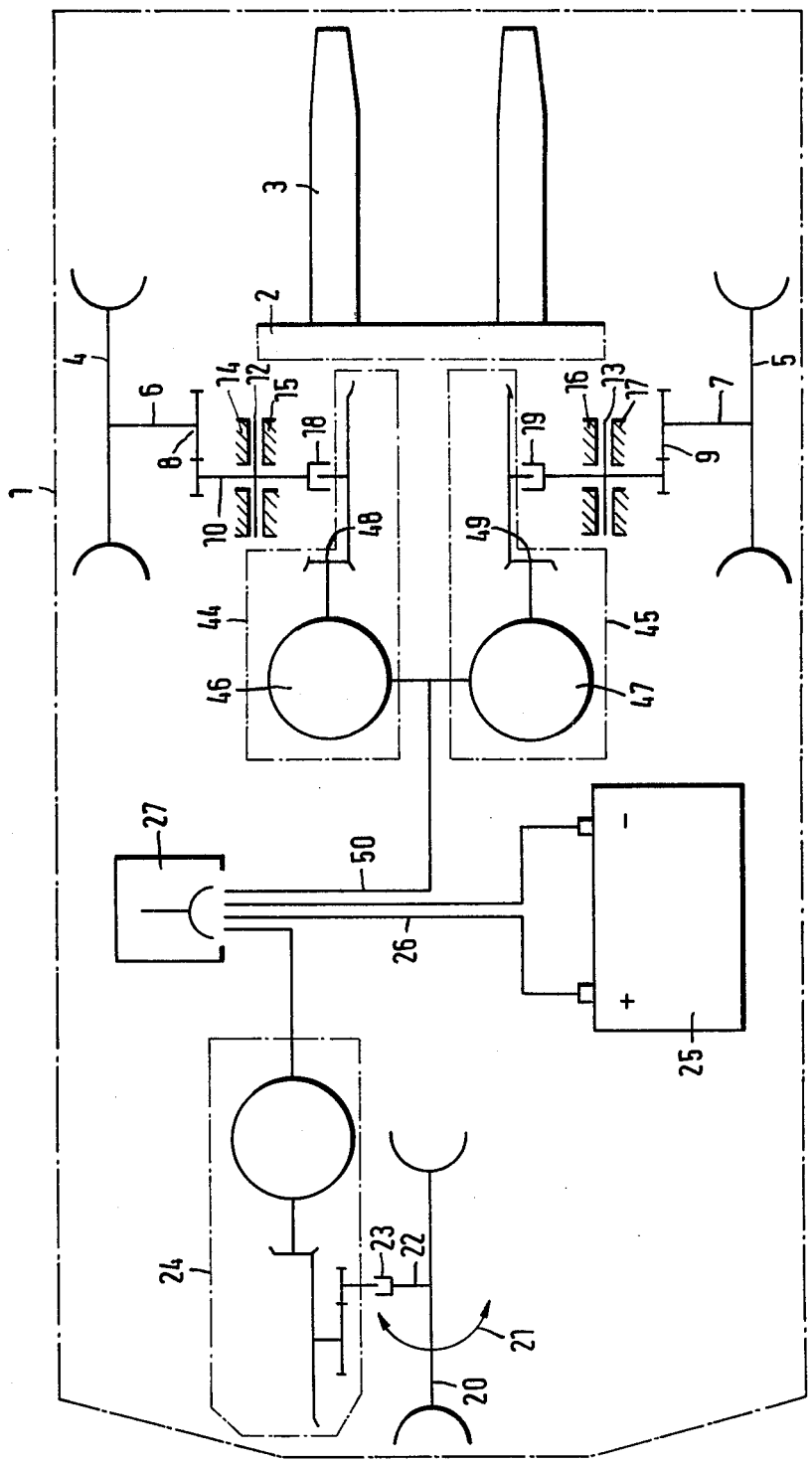
FIG. 4 is a view similar to FIG. 1 of a chassis drive arrangement but illustrating an all-wheel single-wheel drive.

In FIG. 4 there are likewise employed the same reference numerals for similar parts. FIG. 4 illustrates an arrangement of the chassis 1 as single-wheel drive with the geared driving motor 24 at the rear end and two geared driving motors 44, 45 instead of the geared driving motor 29 in the arrangement of FIGS. 2 and 3. The two geared driving motors 44, 45 each comprise an electric motor 46, 47 and a bevel gear step 48, 49 respectively, the bevel gear step 48 being connected to the coupling means 18 and the bevel gear step 49 being connected to the coupling means 19. As shown, both driving motors 44, 45 may be connected in parallel through a line 50 to the controller 27, or there may be provided separate connections that allow to deactivate, in a manner known per se, the inner front wheel 4 or 5 when the vehicle travels through curves, or that optionally allow a reversal of rotary direction (c.f. e.g. U.S. Pat. No. 2,732,022).

The deactivation of either one geared driving motor 29 according to FIG. 2 or of one of the geared driving motors 44, 45 according to FIG. 4 may be effected in dependence upon the angular position of the rear wheel 20 which is steerable by means of the rotary bogie.

The term "line" as employed here is intended to designate all of the functional connections required.

The above described pivoted bogie may also carry a group of twin wheels which are driven by an electric motor via a differential or by two geared driving motors (British Pat. No. 853,045).

What is claimed is:

1. A chassis drive arrangement particularly for electrically driven mobile machines including a chassis having a front end and a rear end comprising: wheel assemblies located respectively at said front end and said rear end each including wheel means, one of said wheel assemblies including at least one steerable wheel and the other of said wheel assemblies including at least one non-steerable wheel; geared driving motor means including at least one geared driving motor; control means for operating said geared driving motor means; a pivotally mounted bogie having at least one steerable wheel arranged thereon; coupling means associated with each of said wheel assemblies adapted to enable selective connection and disconnection of individual ones of said geared driving motors with individual ones of said wheel assemblies to enable said chassis drive arrangement to be selectively connected to be driven by a selected number of said geared driving motors; brake means arranged on at least one of said wheel assemblies between said coupling means and said wheel means; and gear transmission means arranged on said at least one of said wheel assemblies between said brake means and said wheel means; said drive arrangement being arranged such that when one geared driving motor is arranged at only one of said wheel assemblies said geared driving motor is designed to deliver the entire propulsive power for said vehicle and such that when at least two geared driving motors are arranged at two or more wheel assemblies said geared driving motors are designed to each deliver a portion of the total vehicle propulsive power and to jointly deliver the total vehicle propulsive power.

* * * * *